Dec. 7, 1965
G. W. WASSELL
3,221,890
FILE TRAY
Filed July 23, 1962
4 Sheets-Sheet 1
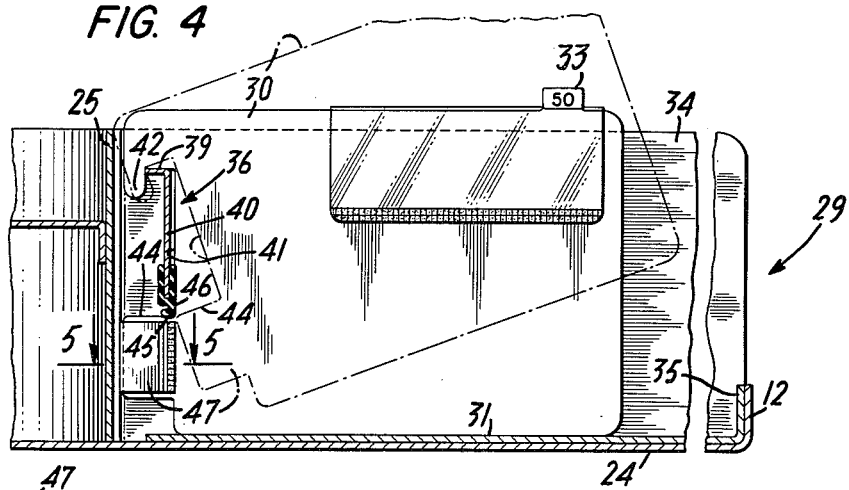
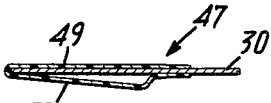
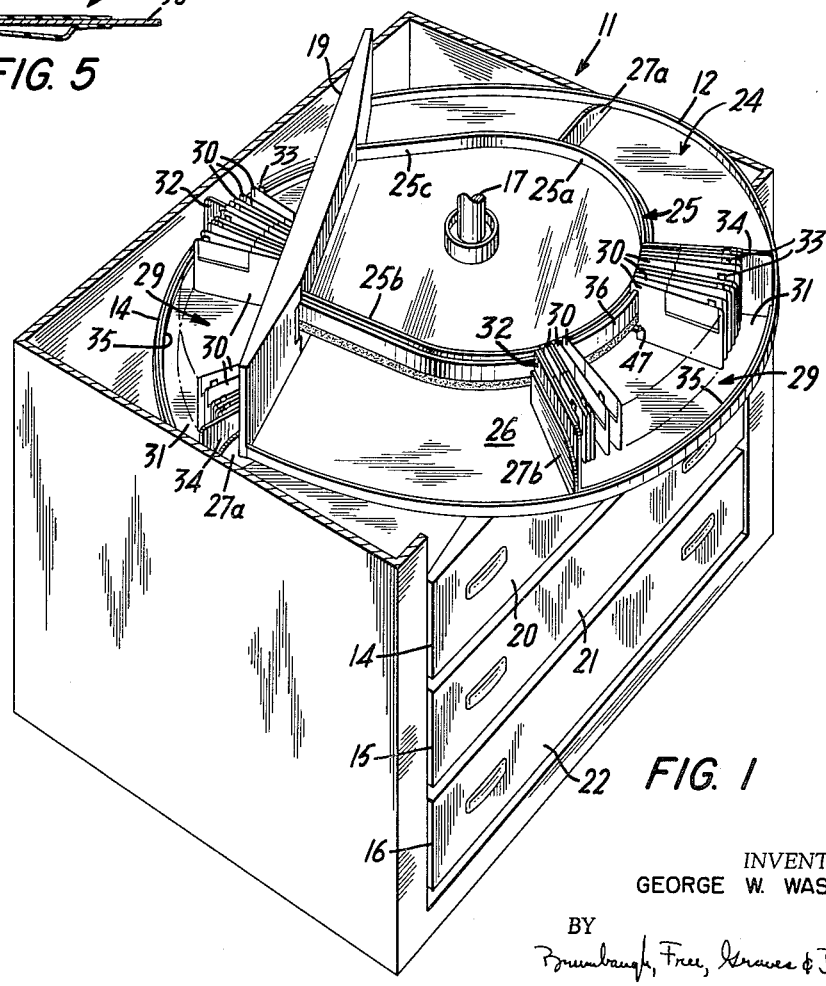
INVENTOR.
GEORGE W. WASSELL
BY
his ATTORNEYS Dec. 7, 1965  G. W. WASSELL  3,221,890
FILE TRAY
Filed July 23, 1962  4 Sheets-Sheet 2

INVENTOR.
GEORGE W. WASSELL
BY
his ATTORNEYS

Dec. 7, 1965   G. W. WASSELL   3,221,890
FILE TRAY
Filed July 23, 1962   4 Sheets-Sheet 3
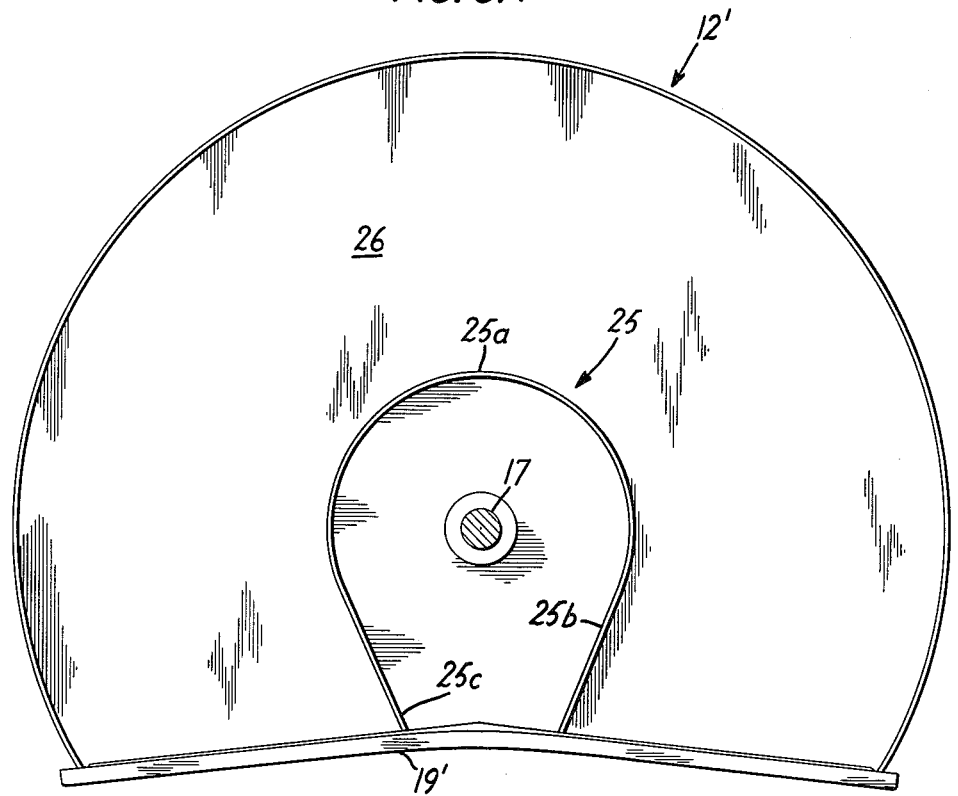
FIG. 6A
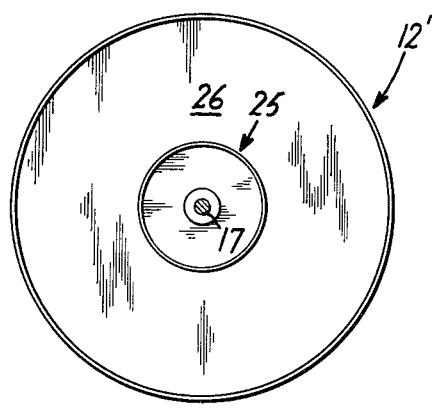
FIG. 6B
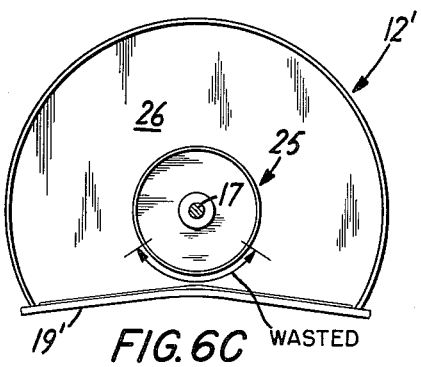
FIG. 6C  WASTED
INVENTOR.
GEORGE W. WASSELL
BY
his ATTORNEYS

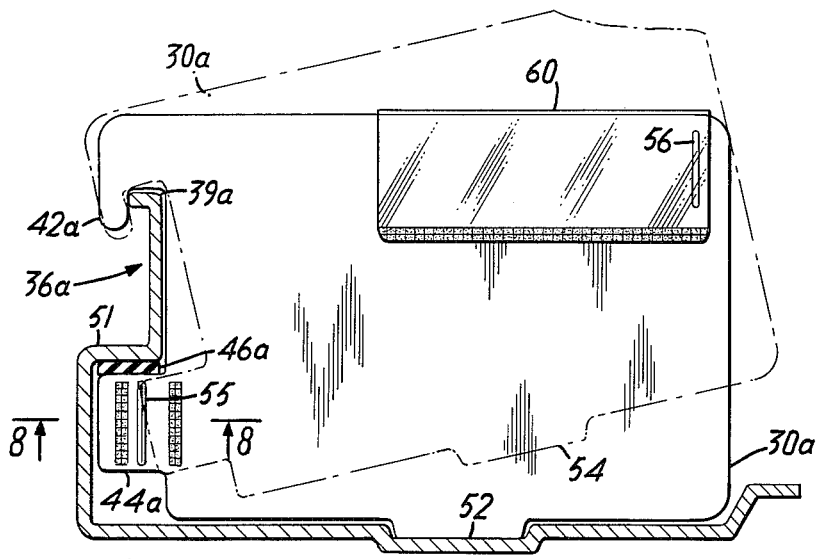
FIG.7
FIG.8
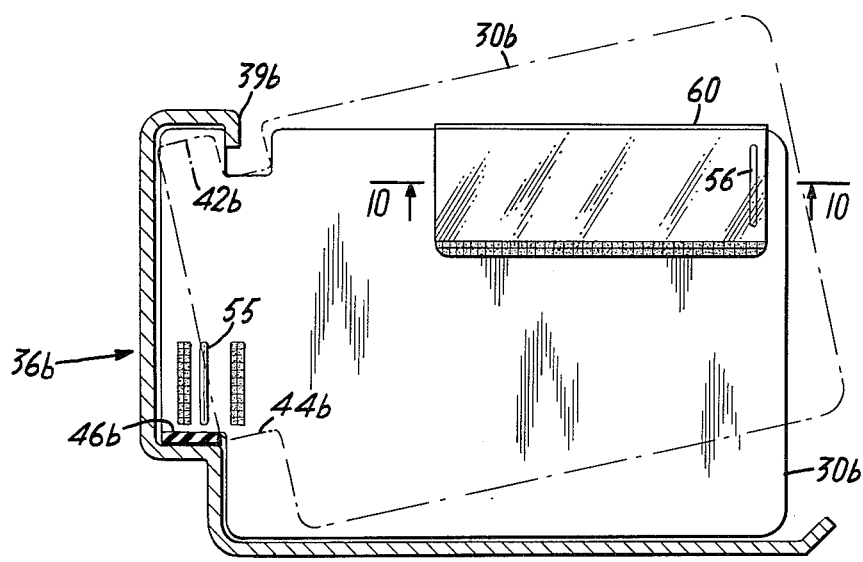
FIG.9
FIG.10
INVENTOR.
GEORGE W. WASSELL
BY
his ATTORNEYS

United States Patent Office 3,221,890
Patented Dec. 7, 1965

3,221,890
FILE TRAY
George W. Wassell, Westport, Conn., assignor to Wassell Organization, Inc., Westport, Conn., a corporation of Delaware
Filed July 23, 1962, Ser. No. 211,575
10 Claims. (Cl. 211—10)

This application is a continuation-in-part of my co-pending application Serial No. 734,364 filed May 9, 1958, now Patent No. 3,071,426, which, in turn, is a continuation-in-part of my application Serial No. 661,416 filed May 24, 1957, now abandoned.

This invention relates to data filing systems, and, more particularly, to rotary data filing systems in which a plurality of accounts of frequent servicing and of varying volume are established.

In the filing and storage of data, provision must be made for simple and rapid access to the various groupings of data. Further, these groupings should be flexible so that data may be removed and added with ease. For example, in the filing of checks in commercial banks, the checks for an individual account are stored as they are received during a given banking period until they are returned to the depositor at the end of the period. In such a filing system as this, the files are virtually empty of checks at the beginning of a period, whereas at the end of the period the filing system contains many checks. Further, the number of checks handled for any one account often varies from period to period because of seasonal variations, for example. As may be seen, then, the filing systems for banks in particular must be flexible and capable of handling the wide variations in filings that are encountered.

The present invention is directed toward providing such a flexible filing system. A given filing area is adapted to be subdivided by a plurality of card-like guides whose positions within the filing area are variable. Each of the guides serves to segregate a particular account, and may be moved within the area to vary the space allocated to a particular account by merely pivoting the guide and sliding it along a supporting track. Suitably spaced guides are also used to index the file. In this fashion, the manipulation of accounts is facilitated without requiring the disruption of the setup to accommodate changes in a single account.

The adjustability of the guides is accomplished by employing a track-like member common to the entire filing area to support the guides. An edge of each guide is cut to provide a hook which is engaged by a lip on a portion of the supporting track to retain the guide on the track. A tab or similar portion of the guide resiliently engages another portion of the track to prevent movement of the guide along the track. At the same time, however, the guide may be pivoted about the lip out of resilient engagement with the track. In this pivoted position, the guide may be slid along the track from one position to another to provide a suitably sized and located file compartment without requiring removal of the guide from the supporting track.

When it is desired to fix the position of the guide to establish the location of a file, the guide is pivoted so that the tab fits resiliently against the track, e.g., by urging the tab against a resilient strip extending along the track, to hold the guide in place. Preferably, the strip is located on a lower edge of the track.

Additionally, each of the above-described guides may be provided with one or more small protrusions useful for spacing purposes in rotary files. For example, the protrusion may take the form of a wedge that forms an angle with respect to the plane of the guide and, when the files are relatively empty, tends to maintain the guides in a diverging spaced-apart relationship to facilitate access to the file.

Further, the present invention provides an arcuate shaped partition or inner track from which extend tangentially two substantially straight sections to provide increased tray space. In the past, the amount of filing space available in multi-tiered rotary trays has been significantly reduced since front portions of the upper trays are cut away to overcome access difficulties. With proper dimensions between the inner partially arcuate track of the invention and the circular tray, however, as many or even a greater number of guides and filed material interspersed therebetween may be stored in a typical rotary filing area having a cut-away front portion than would be the case if the track were completely arcuate.

A detailed description follows of the invention described in general terms above, which is to be read in conjunction with the appended drawings in which:

FIG. 1 is a perspective view of a typical rotary filing system embodying the present invention, partially cut away to show the file interior;

FIG. 4 is an enlarged sectional view of the filing tray of FIG. 3, taken along the section line 4—4 and looking in the direction of the arrows, showing the details of a guide and a supporting track;

FIG. 5 is an enlarged sectional view of a portion of the guide shown in FIG. 4, taken along the section line 5—5 and looking in the direction of the arrows, showing the details of a wedge used for guide spacing purposes;

FIG. 6A is a plan view of a typical file tray in accordance with the invention;

FIGS. 6B and 6C are plan views of file trays each having a circular track, used for the purposes of illustration to demonstrate the features of the invention;

FIG. 7 is a sectional view of an alternative file tray, guide track, and guide in accordance with the invention;

FIG. 8 is an enlarged sectional view of a portion of the guide shown in FIG. 7, taken along the section line 8—8 and looking in the direction of the arrows, showing the details of a protrusion used for guide spacing purposes;

FIG. 9 is a sectional view of another file tray, guide track, and guide in accordance with the invention; and FIG. 10 is an enlarged sectional view of a portion of the guide shown in FIG. 9, taken along the section line 10—10 and looking in the direction of the arrows, showing the details of a protrusion used for guide spacing purposes.

Figure 2:
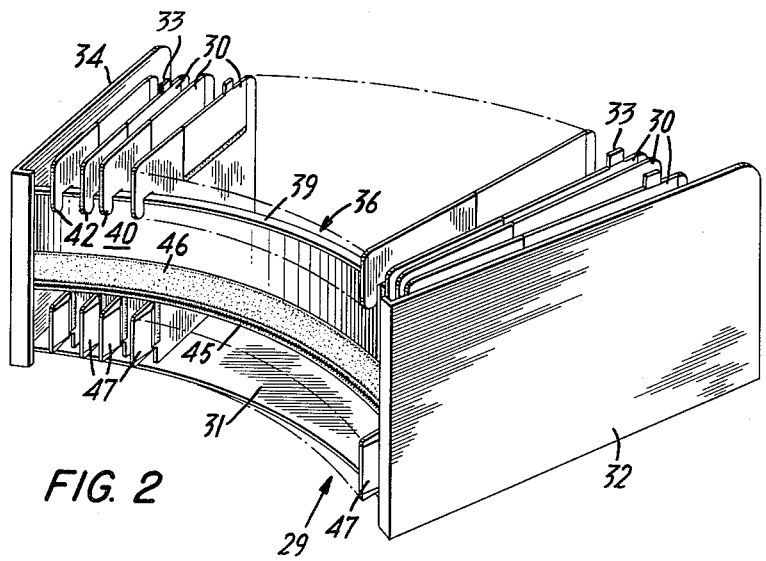
FIG. 2 is an enlarged perspective view from one direction of one of the file trays of the filing system of FIG. 1.

Referring to FIG. 1, the invention is shown embodied in a rotary file 11 which includes a number of separate rotatable trays 12, 14, 15, and 16 journaled for rotation about a common shaft 17 which passes approximately through the center of the filing system. The trays 12 through 16 have flat front face portions 19, 20, 21, and 22, which are pushed to rotate the trays about the shaft 17 from a closed position, as shown for the trays 14, 15, and 16, to an open position, as shown for the tray 12.

Taking the rotary tray 12 as an example, it comprises a flat base plate 24 on which a partially arcuate vertical plate or track 25, described in greater detail hereinafter, defines a filing area 26. A plurality of fixed dividers such as 27a and 27b subdivide the filing area 26 in any desired manner. Smaller filing trays such as the tray 29 in FIG. 1 are adapted to be positioned in the subdivision of the filing area 26 and are adapted to carry a series of card-like guides 30, each one of which is utilized to establish the file for a separate account or for a distinct series of items to be filed together.

FIGS. 1 and 6A show the general arrangement of the filing area 26. The vertical plate or track 25 defining the area is shaped like a horseshoe and is formed from an arcuate section 25a and from two substantially straight sections 25b and 25c. The axis of the arcuate section 25a is the same as that of the shaft 17 about which the entire filing tray rotates. The two substantially straight sections 25b and 25c are tangential to the ends of the arcuate section 25a and extend to front face portion 19' of the tray to define the filing area 26, which lies outside the area surrounded by the arcuate section 25a and the straight sections 25b and 25c.

It has been found that by utilizing such an arcuate section terminating in substantially straight sections, the number of guides 30 that may be accommodated within the filing area 26, as well as the amount of material filed therebetween, is increased over that which would be possible if the track were wholly arcuate or even, in some instances, a continuous circle. FIGS. 6B and 6C illustrate the advantages of the partially arcuate track shown in FIG. 6A. As shown in FIG. 6B, with a circular file tray 12' the track 25 may be completely arcuate. However, such a circular file trays is useless in a multi-tiered file, since one file tray prevents access to the next lower file tray. To provide access, the cut-away file tray 12' shown in FIG. 6C is utilized with the front face portion 19'. Employing a completely arcuate track 25, however, results in the wasting of the portion of the track encompassed by the arrow in the figure. There is no waste with the unique partially arcuate track 25 shown in FIG. 6A with its tangential sections 25b and 25c, however, and the entire extent of the track is utilized for filing purposes.

Figure 3:
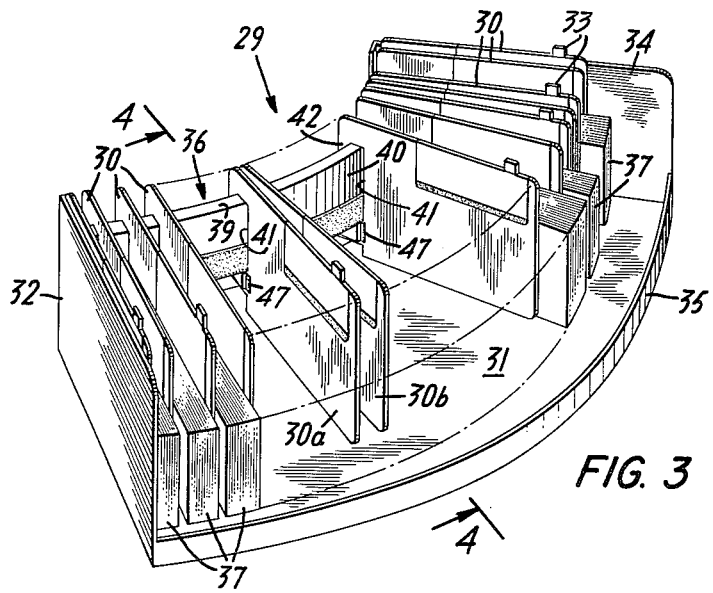
FIG. 3 is a perspective view from another direction of the file tray of FIG. 2.

FIGS. 2 and 3 best show the arrangement for supporting and positioning the guides within the filing area 26. Referring to these figures, the tray 29 comprises a base plate 31, a pair of end plates 32 and 34, a front rim 35, and a supporting member or track 36. As shown in FIG. 3, checks 37 are filed between adjacent ones of the guides 30. Index tabs 33 may be provided on selected guides to facilitate access to particular accounts.

Each of the guides 30 is held by the supporting track 36, which, as may be seen in FIG. 4, is formed with a lip 39 that extends from a vertical portion 40. As shown best in the dotted position of the guide 30, a cavity 41 is formed in one of its edges to receive the track 36. A vertical hook 42 formed at one end of the cavity 41 overhangs the lip 39 of the track 36 and retains the guide 30 in position when it is pivoted upwardly to the dotted position showing in FIG. 4 using the lip 39 as a pivot. The guide is held by the hook 42 on the supporting track 36, yet in this position it is easily slipped along the track from one position to another to accommodate filing changes.

When it is desired to fix the position of the guide 30 on the supporting track 36 to establish the location and size of a particular filing compartment, the guide is pivoted downwardly to the position shown in full lines in FIG. 4. In this position, a tab 44 forming the lower edge of the cavity 41 bears against a resilient flap 45 of a resiliant strip 46, formed from rubber or similar material, which is suitably attached to the portion 40 of the supporting track 36. If desired the flap 45 may be omitted. The biasing force of the resilient strip 46 against the tab 44 retains the guide 30 in a fixed position along track 36. When desired, the guide may readily be pivoted upwardly to the position shown in dotted lines and slipped along the track as described above without requiring its removal from the tray. In this fashion, any number of various size filing compartments may be provided rapidly and simply along the track without involving a great deal of manipulation of the guides 30.

In this regard, although the tray 12 shown in FIG. 1 is partitioned by a series of fixed dividers 27a and 27b which establish the positions that the individual filing trays 29 assume, it should be noted that the tray 12 could be formed as shown in FIG. 6A without any dividers whatsoever. In this case, the tray 12 could still accommodate individual trays 29 or, if desired, the horseshoe-shaped track 25 could be formed in a fashion similar to that of the track 36 to support the guides 30 directly.

FIGS. 7 and 9 show two alternative tray, track, and guide arrangements. As shown in FIG. 7, a track 36a is formed with a lip 39a which engages a hook 42a on a guide 30a, which is similar to the arrangement shown in FIG. 4. A bottom portion 51 of the track 36a carries thereon a resilient strip 46a which resiliently bears against tab 44a of the guide 30a when the guide is in the position shown in full lines in FIG. 7. When the guide 30a is pivoted upwardly as shown in dotted lines in the figure, the tab 44a is withdrawn from resilient engagement with the resilient strip 46a, and the guide may be slid along the track 36a to any position within the filing area.

The bottom oprtion of the filing tray shown in FIG. 7 has a small cavity 52 formed therein which is adapted to receive a tab 54 on the guide 30a when the guide is in the position shown in full lines in the figure. This helps to retain the guide in a fixed position.

In the arrangement shown in FIG. 9, an overhanging lip 39b extends inwardly to engage a hook 42b on a guide 30b. A resilient strip 46b positioned along a lower portion of a track 36b resiliently engages a tab 44b of the guide 30b when the guide is in the position shown in full lines in the figure. The guide 30b is pivoted upwardly in the same fashion as the guides shown in FIGS. 4 and 7 to slide the guide 30b along the track 36b.

A protrusion, such as a wedge 47 shown best in FIGS. 4 and 5, may be provided on each guide 30. The wedge is especially useful in rotary files, and, as may be seen in FIG. 5, comprises a sheet 49 of material, such as plastic, for example, which is attached to the guide 30. An angled portion 50 of the sheet 49 slants outwardly with respect to the plane of the guide 30, and this forms a projecting surface which bears against another guide to maintain a pair of adjacent guides 30a and 30b of FIG. 3, for example, in a diverging spaced-apart relation when there are no checks or other data filed therebetween. This facilitates the insertion of the initial checks to be filed between the guides 30a and 30b when a new account is opened or at the beginning of a new accounting period for an old account, for example. Because the relatively large wedge 47 is located on the inside edge of the guide 30 adjacent the supporting member 36, rather than on the outside edge adjacent the rim 35, the wedge does not interfere with the insertion of checks between adjacent guides. Further, in the case of rotary files, the separation of the outer edges of the guides is easily accommodated because of the increased outer diameter of the circular file tray.

In FIGS. 7 and 9, the guides 30a and 30b are each formed with protrusions 55 and 56 adjacent opposite edges of the guides. The protrusions are rod-shaped, as shown in FIGS. 8 and 10, and may be formed by stamping the guides. In the case of the protrusion 55, the opposite side of the guide contains a cover 57 which covers a cavity 59 formed by the stamped protrusion and prevents a protrusion on one guide from entering the cavity on an adjacent guide. The protrusion 56, on the other hand, is completely covered by an identifying marker 60 which fits over the guide.

From the description of the invention above, it is apparent that a novel filing system has been provided which is susceptible of simple and rapid adjustment to accommodate changing volumes of data in the files. It is also apparent that modifications of the apparatus shown may be made which will nonetheless be embraced by the invention. It will be understood, therefore, that the above-described embodiments of the invention are illus-

I claim:

1. Filing apparatus comprising a tray, a track having an elongated notch extending along its side surface at positions equi-distant above the tray, the track being positioned above the tray, resilient material adjacent the edge of the notch in the track, at least one movable guide supported by the track, the guide having a portion thereof that is normally resiliently engageable with the resilient material adjacent the edge of the notch in the track to prevent movement of the guide along the track, the guide being pivotable without deforming out of resilient engagement with the track and slidable along the track to a desired position on the track where it may be pivoted back into resilient engagement with the track.

2. Filing apparatus comprising a tray, a track positioned above the tray, a lip formed on a portion of the track, at least one movable guide supported by the track, the guide having a hook formed on one edge thereof engaging with the track lip, and a portion of the guide fitting resiliently against a portion of the track to prevent movement of the guide along the track, the guide being continuously pivotable without deforming about the track lip out of resilient engagement with the track and slidable along the track to a desired position on the track where it may be pivoted back into resilient engagement with the track.

3. Filing apparatus comprising a tray, a track positioned above the tray, a lip formed on a portion of the track, a resilient strip extending along the track, and a plurality of movable guides supported by the track, each of the guides having a hook formed on one edge engaging with the track lip and having a portion thereof that fits against the resilient strip to prevent movement of the guide along the track, the guide being continuously pivotable without deforming about the track lip out of engagement with the resilient strip and slidable along the track to a desired position on the track where it may be pivoted back into resilient engagement with the track.

4. Filing apparatus as defined in claim 3, wherein the resilient strip includes a resilient flap to engage the guide.

5. Apparatus for the filing of material, comprising a tray, and a track positioned above the tray and formed with an arcuate section and two sections substantially tangential to the ends of the arcuate section, for defining a filing area on the tray outside the area surrounded by the arcuate section and the two substantially tangential sections.

6. Filing apparatus comprising a rotatable tray formed from a circular base plate from which a portion has been cut away, a track positioned above the base plate, the track being formed from an arcuate member having as its center the axis of rotation of the rotatable tray and two substantially straight members substantially tangential to the ends of the arcuate member and terminating substantially at the cut-away portion of the base plate.

7. In combination with apparatus as recited in claim 5, at least one movable guide supported within the filing area by the track, the guide being pivotable to render it slidable along the track to a desired position.

8. Filing apparatus comprising a rotatable tray formed from a circular base plate from which a portion has been cut away, and a track positioned above the base plate, the track being formed from an arcuate member having as its center the axis of rotation of the rotatable tray and two substantially straight members extending from the ends of the arcuate member to the cut-away portion of the base plate, the substantially straight members being spaced from the axis of rotation of the rotatable tray.

9. Filing apparatus comprising a tray having a cavity therein, a track positioned above the tray, a lip formed on a portion of the track, a plurality of movable guides supported by the track each having a tab formed on the lower edge thereof adjacent the tray which is receivable into the cavity in the tray, and a resilient strip including a resilient flap to engage the guide extending across the track, each of the guides having a hook formed on one edge thereof engaging with the track lip and having a portion thereof that fits against the resilient strip to prevent movement of the guide along the track, the guide being pivotable about the track lip out of engagement with the resilient strip and slidable along the track to a desired position.

10. Filing apparatus comprising a tray, track means positioned above the tray and including an arcuate section and two sections substantially tangential to the ends of the arcuate section for defining a filing area on the tray outside the area surrounded by the arcuate section and the two substantially tangential sections, and a plurality of movable guides supported by the track means and extending primarily into said filing area, each of the guides being pivotable and requiring pivoting to render it slidable along the track means to a desired position, each guide being independent from the other guides.

References Cited by the Examiner

UNITED STATES PATENTS

| 2,261,840 | 11/1941 | Bergmann | 129—16 |
| 2,308,629 | 1/1943 | Rosenberg | 211—184 X |
| 2,309,896 | 2/1943 | Gustafson | 211—184 X |
| 2,368,349 | 1/1945 | Cornish | 129—16 |
| 2,522,483 | 9/1950 | Plack | 108—61 X |
| 2,550,117 | 4/1951 | Hall | 129—16 |
| 2,688,409 | 9/1954 | Echlin | 211—184 |
| 2,697,631 | 12/1954 | Miller | 211—184 |
| 2,711,741 | 6/1955 | Wassell | 108—61 X |

FOREIGN PATENTS

| 629,132 | 5/1934 | Germany. |
| 634,104 | 3/1950 | Great Britain. |
| 63,076 | 4/1949 | Netherlands. |

FRANK B. SHERRY, *Primary Examiner.*

CHANCELLOR E. HARRIS, *Examiner.*